M. B. COBURN.
HAT AND COAT HOOK.

No. 171,920. Patented Jan. 11, 1876.

Witnesses.
A. B. Richmond.
R. C. Frey.

Inventor.
Melville Beveradge Coburn

UNITED STATES PATENT OFFICE.

MELVILLE B. COBURN, OF MEADVILLE, PENNSYLVANIA.

IMPROVEMENT IN HAT AND COAT HOOKS.

Specification forming part of Letters Patent No. 171,920, dated January 11, 1876; application filed February 6, 1874.

*To all whom it may concern:*

Be it known that I, MELVILLE BEVERADGE COBURN, of the city of Meadville, in the county of Crawford and State of Pennsylvania, have invented a new and Improved Wardrobe Clothes-Hook; and I do hereby declare that the following is a full and exact description of the same, reference being had to the accompanying drawings forming a part of this specification, in which—

Figure 1:
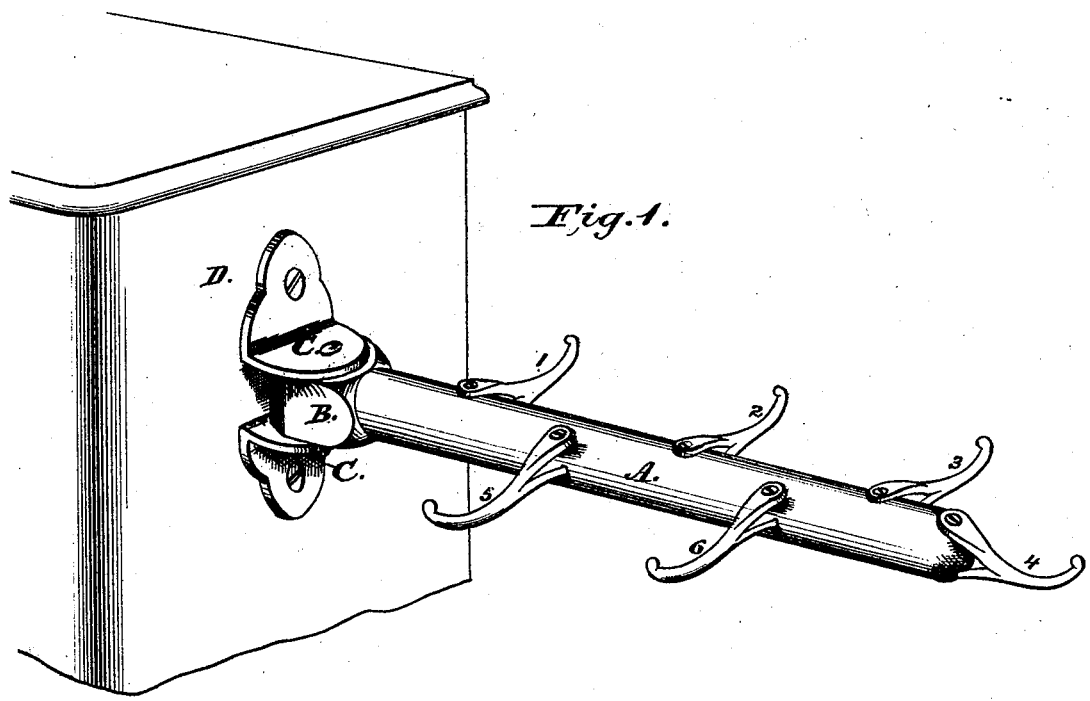
Figure 2:
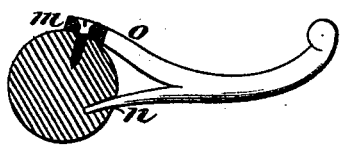

Figure 1 is a view of a wardrobe-arm, to which are attached hooks embodying my invention, and Fig. 2 is a transverse section of the same, illustrating the manner in which the hook is secured and the spur thereof enters the surface to which the hook is attached.

Like letters refer to like parts wherever they occur.

Wardrobe-arms and similar swinging arms are generally, for the sake of finish and appearance, formed round or oval in cross-section, and will vary in size to such a degree that hooks, as commonly formed, which could be readily secured to the convex surface of an arm of a given size, and could be arranged regularly thereon, could not be as readily secured or adapted to an arm of a different size. The same remarks are applicable to moldings and other irregular surfaces.

The object, therefore, of the present invention is to produce a cheap strong hook, which is adapted to be secured to different-sized wardrobe-arms, moldings, &c.; and it consists in forming the hook with a bifurcation, one arm of which shall have a screw-hole so situated that the screw may be driven at, or nearly at, right angles to the projecting or weight-sustaining portion of the hook, the other arm of the bifurcated portion forming a point or spur which can be forced into the surface to which the hook is secured to any extent necessary in adjusting the same.

I will now proceed to describe my invention, so that a person skilled in the art to which it appertains may make and use it.

A indicates a wardrobe-arm, secured to a wall or similar surface, D, by brackets C, all of which may be as shown, or of any well-known form. E is my hook, forked or bifurcated, as at $e$, and having a screw or nail hole, $o$, in the extremity of the superior arm, $e'$, said arm being, by preference, nearly in line with hook E, so that the screw or nail which secures it may be driven at such an angle to the line of strain as will prevent the nail from being drawn by any weight upon hook E. The inferior or lower arm is brought to a point, as at $n$, to form a spur which may be forced into arm A, or a similar surface, when adjusting the hook.

This spur being at an angle to both the binding-screw and the projecting arm of the hook, it will be found tends to prevent the drawing of the nail or screw, which is likely to occur when the brace projects in the line of the binding-screw.

Having thus described my invention, what I claim, and desire to secure by Letters Patent, is—

A bifurcated hook, one arm of the bifurcation provided with a hole which permits the binding-screw to be driven at, or nearly at, right angles to the hook proper, and the other arm terminating in a spur which permits of the hook being adjusted to surfaces of different convexities, substantially as specified.

MELVILLE BEVERADGE COBURN.

Witnesses:
A. B. RICHMOND,
R. C. FREY.